Figure 1:
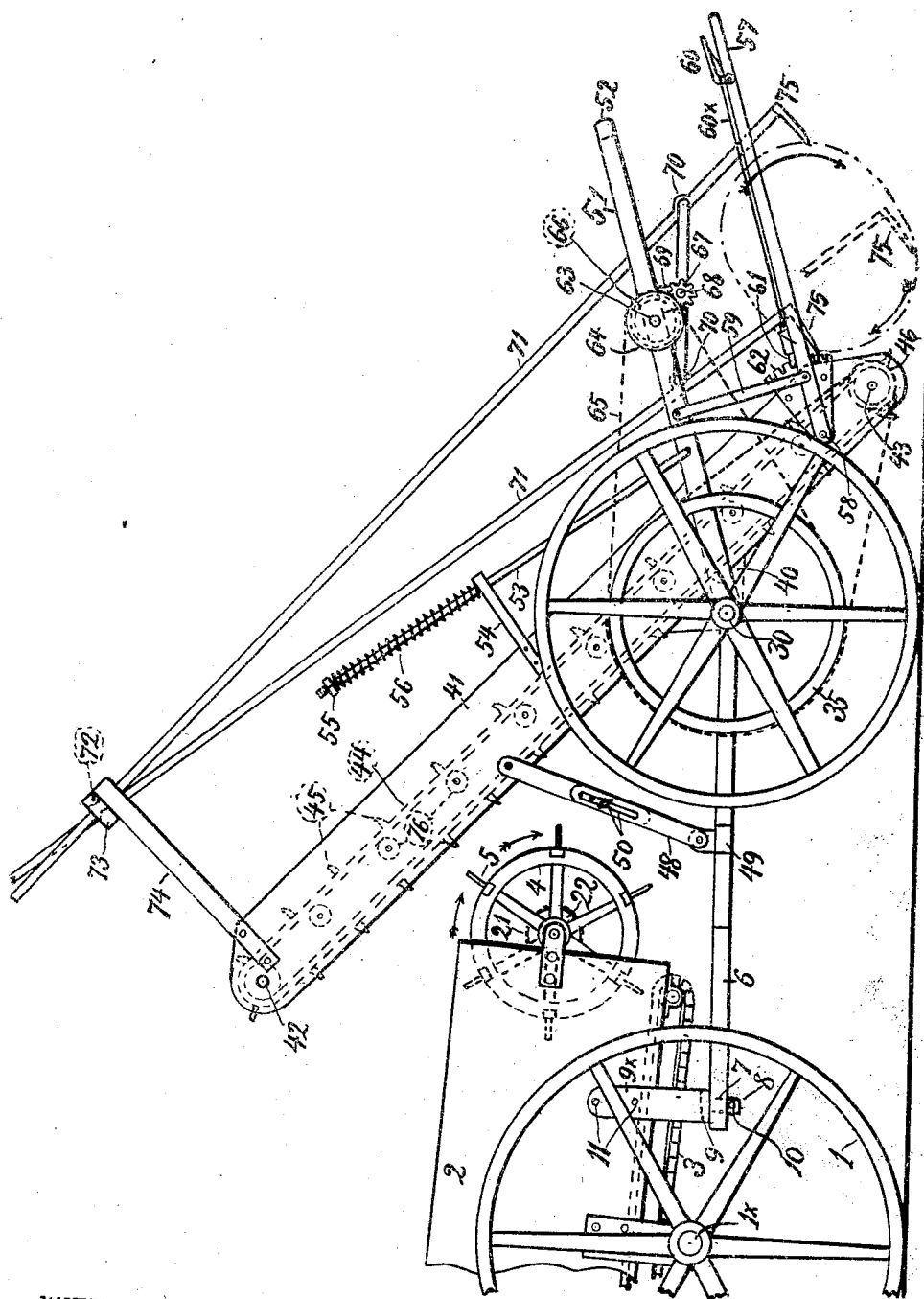

F. A. JAHN.
MANURE LOADER.
APPLICATION FILED SEPT. 22, 1913.

1,098,502.

Patented June 2, 1914.
2 SHEETS—SHEET 2.

FIG. 2.

WITNESSES:
A. E. Carlsen
E. C. Carlsen

INVENTOR.
Frederick A. Jahn,
BY his ATTORNEY:
A. M. Carlsen.

UNITED STATES PATENT OFFICE.

FREDERICK A. JAHN, OF NEW PRAGUE, MINNESOTA.

MANURE-LOADER.

1,098,502.  Specification of Letters Patent.  Patented June 2, 1914.

Application filed September 22, 1913. Serial No. 791,064.

*To all whom it may concern:*

Be it known that I, FREDERICK A. JAHN, a citizen of the United States, residing at New Prague, in the county of Lesueur and State of Minnesota, have invented a new and useful Manure-Loader, of which the following is a specification.

My invention relates to devices for loading manure spreaders, and the object is to provide a machine which when attached to a manure spreader or manure hauling wagon and the latter is driven over a barnyard or other ground where manure has been deposited, will automatically take the manure from the ground and load it into the box of the wagon or spreader as the case may be.

In the accompanying drawings: Figure 1 is a side elevation of my manure gatherer and loader attached to the rear portion of a wagon of the kind known as manure spreaders, they having certain mechanism by which to spread the manure automatically as they are drawn; of said mechanism only some parts are shown. Fig. 2 is a top or plan view of what is shown in Fig. 1 but with the spreading mechanism sufficiently completed to enable the operation of the loading device in combination with the spreader to be described.

Referring to the drawing by reference numerals, 1 designates the hind wheels, 1ˣ the hind axles, 2 the box and 3 the endless movable bottom of a manure spreader of the type resembling a wagon, having four wheels, and a tongue and draft appliance (not shown) to which a team is usually hitched and as the vehicle is drawn over a field the manure is fed rearward by motion of the endless bottom 3 and an operative connection with one of the wheels 1, while a rotating roller 4 mounted in the open rear end of the box 2, is also operatively connected with one of the hind wheels 1 and rotated at a considerable speed so as to spread the manure upon the field. It is to such a manure spreader in general that my loading device, presently to be described, is attached, preferably by having its pole 6 provided with a hole 7 adapted to go upon a stud 8 of a bar 9 and be detachably held in place by a pin 10 in the stud. Said bar 9 crosses the box 2 below the lower run of the endless conveyer 3 constituting the bottom of the box, and has its ends 9ˣ turned upward and secured at 11 to the sides of the box.

The operative connections already mentioned may be of any suitable construction, but in order to show them as operable in combination with my loading device I will describe one form of them, which may be as follows: Rotated by one of the ground wheels 1 is a cog wheel 12 (see Fig. 2) meshing with a smaller cog wheel or pinion 13; the latter is fixed to a sprocket 14 by a sleeve 15, which is rotatable on a stud 16 where it is slidably retained between two pins 17, 18. The wheel 1 is provided with several studs 19, and the sprocket 14 with a single stud 20. A link belt 21 connects the sprocket 14 with a sprocket 22 fixed on the spreading roller 4. On a stud 23 rotates and slides a wheel 24 having spaced peripheral cogs 25 and a peripheral groove 26 in its hub. In said groove engages a finger 27 of a collar 28, having a screw 29 for securing it in any desired place on the stud. If the wheel 24 is in the position shown in full lines it will be engaged by each passing peg 19 and rotated slowly in one direction; if moved to the position 24ᵃ it will be rotated in the reverse direction by the peg 20, and if in the position 24ᵇ it will stand still between the pegs 19 and 20; this is to enable the bottom 3 to move rearwardly during the manure spreading process and forwardly during the loading process, and when neither process is in operation the entire operating mechanism just described is set at rest by moving the sleeve 15 inward on its stud until the pinion 13 passes out of mesh with the cog-wheel 12. In such position the sleeve may be held by the pin 18, which is for that purpose moved into an extra hole 30 in the stud, outside the pinion 13.

Turning now to the loading device, the bifurcated rear end of the pole 6, which pole may also be termed a tongue or a reach, is connected with the axle 30 of the loader. Said axle is journaled in the hubs of two supporting wheels 31, 32, each of which has its hub formed with ratchet teeth 33, arranged to engage a similar hub 34 of a sprocket wheel 35. Each of said sprockets is slidable on the axle and engaged by a shifter 36, or 36ˣ, fulcrumed on a frame arm 37 and movable into either one of two notches 38, 39 in an extension of the frame arm.

Mounted on the axle 30 by bearings 40 (see Fig. 1) is the main frame 41 of the loader. In said frame are journaled two rollers 42, 43 over which an endless conveyer belt 44, having carrier cleats 45 is stretched and is operated by a sprocket wheel 46 fixed on the roller 43 and engaged by a link belt 47 from the right side sprocket 35. The frame 41 is held at any desired incline by braces 48, supported on lateral projections 49 of the pole and having each a slidable joint 50 making it extensible.

Journaled on the axle is also an arched frame 51, whose top bar 52 crosses the main frame; said arched frame is preferably counterbalanced in an inclined position by a rod 53 pivoted to it and slidable in a post 54 on the main frame, said rod is near its upper end provided with a nut 55, between which and the post 54 is partly compressed a coil spring 56. The desired incline of the frame 51 is regulated by a lever 57, pivoted at 58 and connected to the frame by a link 59. On the hand lever 57 is mounted a finger-lever 60, operating by a rod 60ˣ a dog 61, which is arranged to engage a notched sector 62 fixed on the main frame.

Mounted on the arched frame by a stud 63 is a sprocket 64, driven by a link-belt 65 and the sprocket 35 at the left side of the machine. Fixed to the sprocket 64 is a cog wheel 66, which meshes with a pinion 67, that is fixed on a multiple crank-shaft 68 journaled in bearings 69 on the arched frame.

Each crank of the crank shaft engages in a box 70 of a rod 71, which has its upper end guided in an aperture 72 in a transverse frame bar 73, which is mounted on posts 74 secured on the main frame; the rear end of each rod is provided with a rake 75. In Fig. 1 76 designates anti-friction rollers supporting the upper run of the endless carrier 44. Said carrier is preferably made of endless link belts and wooden strips 77 (see Fig. 2) secured thereon, but as such endless aprons or carriers are already known in almost every possible form, I need not here describe any specific construction of same.

In the operation of the machine the loader is attached to the spreader, and as the former is drawn by a team or other suitable power the crank shaft operates the rakes, moving them in the direction of the arrows in Fig. 1, so that the rakes take up the manure from the ground and throw it upon the conveyer 44, and as the latter is simultaneously operated by the link-belt 47 the manure is carried upward and forward and deposited into the rear end of the box 2 of the spreader. To prevent that only the rear end of said box be filled the bottom 3 of the box is kept in forward motion by the mechanism already described for that purpose; and if such motion should be greater than necessary the mechanism causing the motion may be operated only intermittently by moving the wheel 24 to the position 24ᵃ only when the rear end of the box is getting too full, and otherwise keep the wheel at 24ᵇ. During the loading process the link belt 21 remains idle, being removed from one or both of its sprockets.

When the box 2 is loaded the loader is detached from the stud 8 and left at the barn yard or wherever the supply of manure is located, the wheel 24 is placed at 24ᵇ, the spreader is driven to the field, the link belt 21 put on the sprockets, the wheel 24 moved to the full line position and the machine is ready to work as a spreader. If the gear 13 has been moved out of mesh during the driving to the field, so as to prevent noise and wear by having the gears in mesh when not in use, the gear 13 must be restored to mesh with its driver 12 before the spreading is commenced. The reason why I do not show proper levers or shifters for moving the wheels 13, 14 and 24 is that such shifting devices are well known and subject to public use.

What I claim is:

1. The combination with a manure spreading vehicle having a box with an endless conveyer apron in its bottom, the lower run of the apron being exposed underneath the box, of a bar secured with its ends to the sides of the box and extending across and clear below said lower run; and an automatic manure loading device mounted on wheels and having a tongue or pole, and means for detachably attaching said pole to the middle of said bar when the loader is in a position to load manure into the box of the spreader.

2. In a manure loading device the combination with an axle, supporting wheels one at each end thereof, a main frame mounted on the axle, an inclined endless conveyer in the main frame, an upwardly arched frame pivotally mounted at the sides of the main frame, a multiple crank shaft journaled in the arched frame, series of manure gathering and moving devices guided on the main frame and operated by the crank shaft so as to pick up and deliver manure upon the conveyer, a sprocket wheel on the axle near each supporting wheel, a gear pinion fixed on the crank shaft, a stud fixed on the arched frame, a gear wheel rotatable on the stud and meshing with the pinion, a sprocket fixed to the gear wheel and a link-belt engaging said sprocket and one of the sprockets on the axle, and means for coupling the latter sprocket to the adjacent supporting wheel whenever so desired; a sprocket on one of the rollers of the endless conveyer, a link-belt connecting said sprocket with the other sprocket on the axle, and means for coupling the last mentioned sprocket to the adjacent supporting wheel when so desired, and means for attaching said loader to a manure spreader or other vehicle having a box into which the manure is to be loaded.

In testimony whereof I affix my signature, in presence of two witnesses.

FREDERICK A. JAHN.

Witnesses:
MICHAEL SCHIENER,
JOSEPH B. MAERTZ.